United States Patent
Van Buskirk et al.

(10) Patent No.: US 9,840,220 B2
(45) Date of Patent: Dec. 12, 2017

(54) WIRELESS AIRBAG CONTROL SYSTEM

(71) Applicant: L & B Manufacturing, Inc., Brownsdale, MN (US)

(72) Inventors: Loyd C. Van Buskirk, Brownsdale, MN (US); Brian R. Meldahl, Brownsdale, MN (US); Dylan C. Van Buskirk, Brownsdale, MN (US); Steven L. Van Buskirk, Brownsdale, MN (US)

(73) Assignee: L & B Manufacturing, Inc., Brownsdale, MN (US)

(*) Notice: Subject to any disclaimer, the term of this patent is extended or adjusted under 35 U.S.C. 154(b) by 44 days.

(21) Appl. No.: 14/696,617

(22) Filed: Apr. 27, 2015

(65) Prior Publication Data

US 2016/0311387 A1    Oct. 27, 2016

(51) Int. Cl.
*B60R 21/01* (2006.01)
*G01G 19/414* (2006.01)
*B60R 21/16* (2006.01)

(52) U.S. Cl.
CPC .... *B60R 21/01* (2013.01); *B60R 2021/01088* (2013.01); *B60R 2021/01286* (2013.01); *B60R 2021/165* (2013.01); *G01G 19/4142* (2013.01)

(58) Field of Classification Search
CPC  B60R 2021/01061; B60R 2021/01068; B60R 2021/01211; B60R 2021/01218; B60R 2021/01225; B60R 2021/01231; B60R 2021/01238; B60R 2021/01245; B60R 2021/01293; B60R 2021/01088; B60R 2021/23107; B60R 21/01; B60R 21/16; B60R 21/20; B60N 2/0224; B60N 2/0228; B60N 2/0232; B60N 2/0244; B60N 2/0248; B60N 2/665; B60N 2/7082; B60N 2/7088; B60N 2002/026; B60N 2002/0268; B60N 2002/0272
See application file for complete search history.

(56) References Cited

U.S. PATENT DOCUMENTS

| | | | | |
|---|---|---|---|---|
| 4,655,505 A | * | 4/1987 | Kashiwamura | A47C 7/467 297/284.6 |
| 5,835,873 A | * | 11/1998 | Darby | B60R 21/01 180/268 |

(Continued)

OTHER PUBLICATIONS

"CAN Physical Layer and Termination Guide," Aug. 1, 2014, National Instruments.*

(Continued)

*Primary Examiner* — Thomas G Black
*Assistant Examiner* — Sara J Lewandroski
(74) *Attorney, Agent, or Firm* — Nikolai & Mersereau, P.A.; C. G. Mersereau

(57) ABSTRACT

A wireless airbag control system includes a central master electronic control module having an RF transceiver. One or more slave nodes are provided, each slave node being associated with an airbag that is mounted to perform an operating function with respect to a mechanical device. Each slave node further includes an RF transceiver, a central processing unit and a CAN controller. Two-way communication is shared between the slave nodes and the master electronic control module on a prioritized message basis.

5 Claims, 3 Drawing Sheets

(56) References Cited

U.S. PATENT DOCUMENTS

| | | | | |
|---|---|---|---|---|
| 5,964,815 A * | 10/1999 | Wallace | B60R 21/01 | |
| | | | 180/282 | |
| 6,037,731 A * | 3/2000 | Fruehauf | B60N 2/0244 | |
| | | | 297/284.1 | |
| 6,088,643 A * | 7/2000 | Long | A47C 4/54 | |
| | | | 297/284.3 | |
| 6,139,052 A * | 10/2000 | Preamprasitchai | B60R 21/16 | |
| | | | 280/729 | |
| 6,166,451 A * | 12/2000 | Pigott | B60R 21/017 | |
| | | | 307/10.1 | |
| 6,206,416 B1 * | 3/2001 | Faigle | B60R 21/01512 | |
| | | | 280/735 | |
| 6,208,924 B1 * | 3/2001 | Bauer | B60R 21/01 | |
| | | | 315/77 | |
| 6,212,457 B1 * | 4/2001 | Miciuda | B60R 16/0315 | |
| | | | 180/282 | |
| 6,265,788 B1 * | 7/2001 | Davidson | B60R 21/01 | |
| | | | 307/10.1 | |
| 6,302,439 B1 * | 10/2001 | McCurdy | B60R 21/01556 | |
| | | | 280/735 | |
| 6,328,335 B1 | 12/2001 | Mueller | | |
| 6,392,558 B1 * | 5/2002 | Schulmeyer | G05B 19/042 | |
| | | | 340/3.1 | |
| 6,422,087 B1 * | 7/2002 | Potter | B60N 2/0232 | |
| | | | 701/49 | |
| 6,422,596 B1 * | 7/2002 | Fendt | B60R 21/01 | |
| | | | 280/735 | |
| 6,448,671 B1 * | 9/2002 | Wallace | B60R 21/01 | |
| | | | 307/10.1 | |
| 6,746,041 B2 | 6/2004 | Chang et al. | | |
| 7,284,769 B2 * | 10/2007 | Breed | B60R 21/0132 | |
| | | | 180/282 | |
| 7,331,603 B2 | 2/2008 | Hasebe et al. | | |
| 7,469,177 B2 * | 12/2008 | Samad | F02D 41/0215 | |
| | | | 123/406.45 | |
| 8,565,758 B2 | 10/2013 | Owyang et al. | | |
| 8,625,295 B2 | 1/2014 | Alley et al. | | |
| 8,751,066 B1 | 6/2014 | Towers et al. | | |
| 8,751,098 B2 | 6/2014 | Faus et al. | | |
| 8,832,649 B2 | 9/2014 | Bishop et al. | | |
| 8,931,348 B2 | 1/2015 | Kunert | | |
| 9,227,587 B1 * | 1/2016 | Belwafa | B60R 21/205 | |
| 2003/0006594 A1 * | 1/2003 | Bergerson | B60R 21/264 | |
| | | | 280/736 | |
| 2003/0098571 A1 * | 5/2003 | Jost | B60R 21/2035 | |
| | | | 280/728.2 | |
| 2006/0255573 A1 * | 11/2006 | Tobata | B60R 21/18 | |
| | | | 280/733 | |
| 2007/0046004 A1 * | 3/2007 | Komaki | B60R 21/015 | |
| | | | 280/735 | |
| 2007/0118259 A1 * | 5/2007 | Chernoff | B60N 2/002 | |
| | | | 701/36 | |
| 2007/0228703 A1 * | 10/2007 | Breed | B60N 2/0232 | |
| | | | 280/735 | |
| 2007/0233919 A1 * | 10/2007 | Miura | H04L 12/40013 | |
| | | | 710/110 | |
| 2008/0117042 A1 * | 5/2008 | Hyde | A41D 13/018 | |
| | | | 340/540 | |
| 2008/0125940 A1 * | 5/2008 | Breed | B60R 21/013 | |
| | | | 701/45 | |
| 2008/0143521 A1 * | 6/2008 | Hyde | B60R 21/0134 | |
| | | | 340/540 | |
| 2008/0243342 A1 * | 10/2008 | Breed | B60R 21/0132 | |
| | | | 701/45 | |
| 2010/0260102 A1 * | 10/2010 | Liu | H04L 1/1657 | |
| | | | 370/328 | |
| 2010/0289302 A1 * | 11/2010 | Cheng | B60N 2/002 | |
| | | | 297/180.12 | |
| 2011/0260435 A1 * | 10/2011 | Hsu | B60N 2/002 | |
| | | | 280/735 | |
| 2012/0086249 A1 * | 4/2012 | Hotary | B60N 2/0228 | |
| | | | 297/284.3 | |
| 2013/0038045 A1 * | 2/2013 | Kwon | B60R 21/01 | |
| | | | 280/735 | |
| 2013/0113250 A1 * | 5/2013 | Udriste | B64D 11/06 | |
| | | | 297/217.3 | |
| 2013/0194087 A1 * | 8/2013 | Tomer | G08G 1/205 | |
| | | | 340/436 | |
| 2015/0008710 A1 * | 1/2015 | Young | B60N 2/0276 | |
| | | | 297/217.3 | |
| 2015/0095711 A1 * | 4/2015 | Elend | G06F 11/221 | |
| | | | 714/39 | |
| 2015/0129343 A1 * | 5/2015 | Teng | B60N 2/002 | |
| | | | 180/271 | |
| 2015/0210237 A1 * | 7/2015 | Peterson | B60R 21/01538 | |
| | | | 701/45 | |
| 2015/0292635 A1 * | 10/2015 | Van Buskirk | B60G 17/0525 | |
| | | | 137/223 | |
| 2015/0375865 A1 * | 12/2015 | Fischer | B64D 11/0639 | |
| | | | 701/49 | |
| 2016/0001715 A1 * | 1/2016 | Laifenfeld | B60R 16/023 | |
| | | | 701/32.7 | |
| 2016/0031401 A1 * | 2/2016 | Jaradi | B60R 21/015 | |
| | | | 701/45 | |
| 2016/0046207 A1 * | 2/2016 | Arant | B60N 2/62 | |
| | | | 297/284.6 | |
| 2016/0207423 A1 * | 7/2016 | Kolich | B60N 2/4415 | |
| 2016/0207429 A1 * | 7/2016 | Fitzpatrick | B60N 2/646 | |
| 2016/0207577 A1 * | 7/2016 | Pang | B62D 39/00 | |
| 2016/0304004 A1 * | 10/2016 | Sandbothe | A47D 13/00 | |
| 2016/0354027 A1 * | 12/2016 | Benson | A61M 21/02 | |

OTHER PUBLICATIONS

How to Measure Pressure with Pressure Sensors, Nov. 15, 2012, National Instruments, http://www.ni.com/white-paper/3639/en/.*
CAN Physical Layer and Termination Guide, Aug. 1, 2014, National Instruments, http://www.ni.com/white-paper/9759/en/.*
National Instruments, "How to Measure Pressure with Pressure Sensors," Nov. 15, 2012, National Instruments, http://www.ni.com/white-paper/3639/en/.*
National Instruments, "CAN Physical Layer and Termination Guide," Aug. 1, 2014, National Instruments, http://www.ni.com/white-paper/9759/en/.*

* cited by examiner

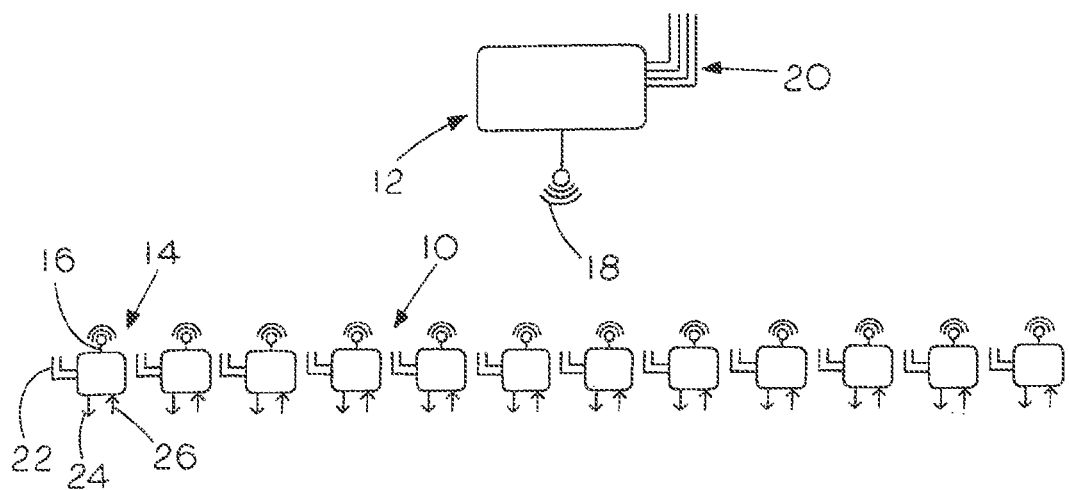
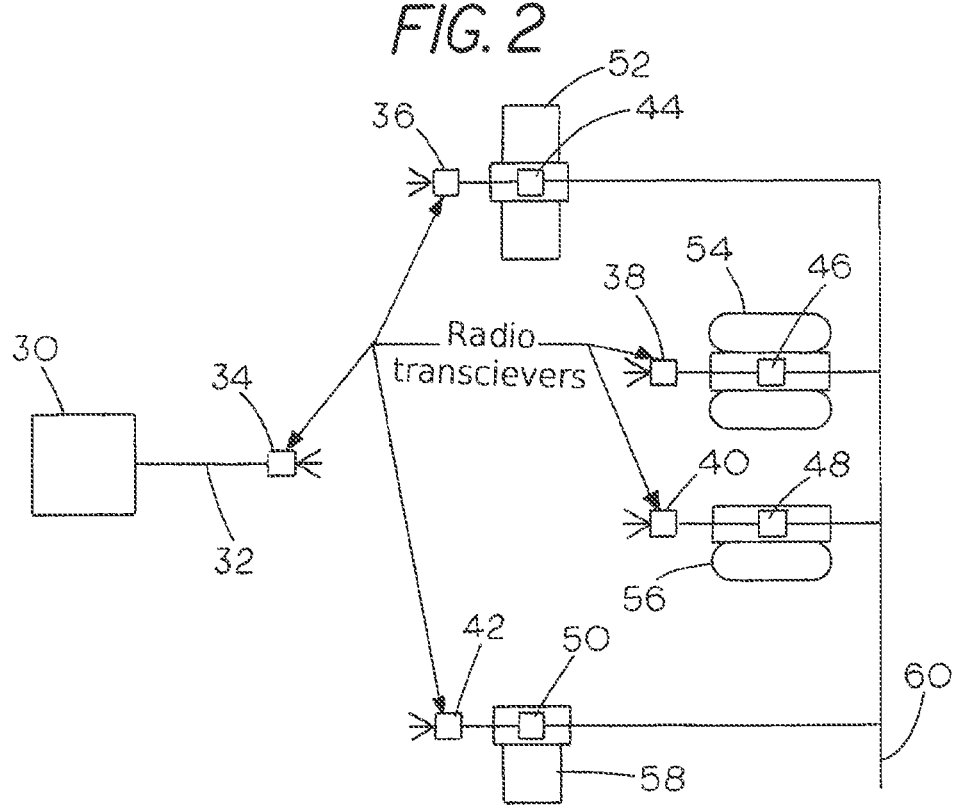

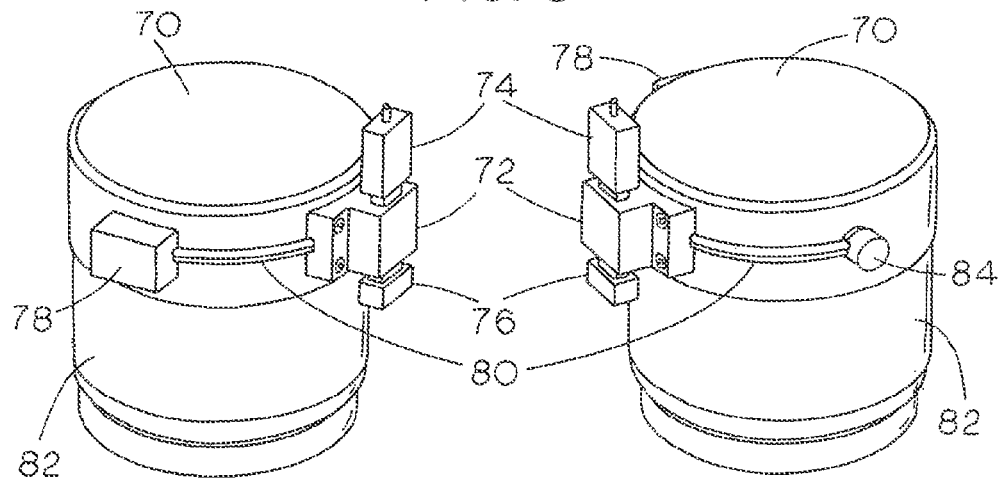
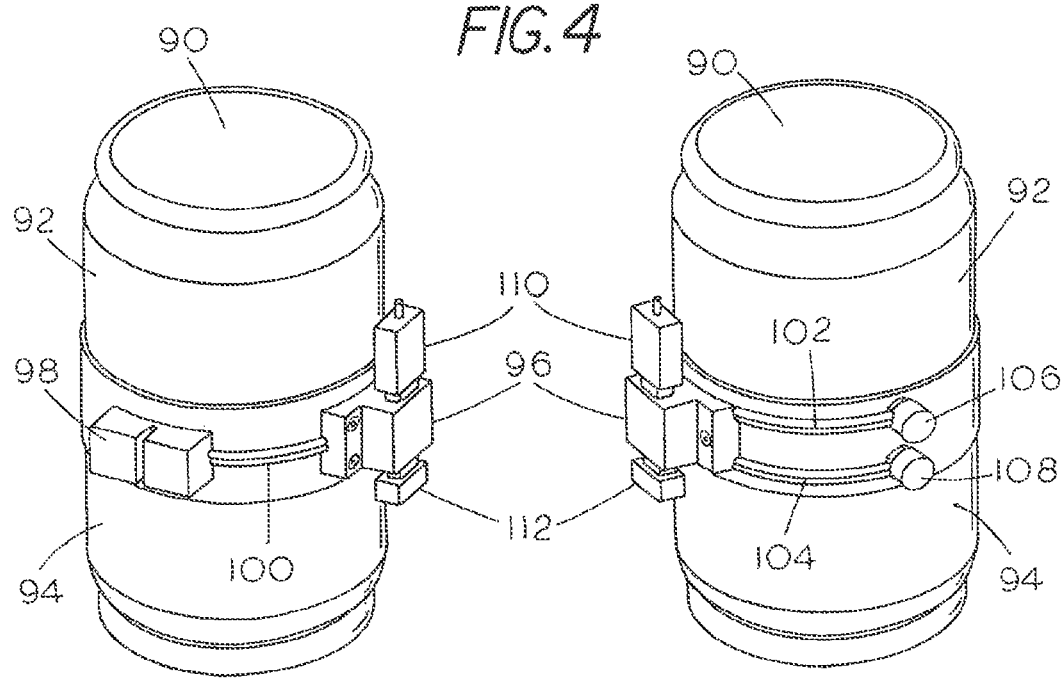

WIRELESS AIRBAG CONTROL SYSTEM

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates generally to a field that includes various types of vehicles and machinery, or other mechanisms that can make use of pneumatic actuators, particularly airbags, for providing and controlling deployment and retraction forces during use. More specifically, the present invention relates to a wireless CANbus airbag control system for controlling the operation of a single or many associated airbags that may be single-acting having one inflatable pneumatic chamber or dual-acting having opposed inflatable pneumatic chambers that enable bi-directional operation.

II. Related Art

Pneumatic actuating systems of a variety of types have been associated with the operation of many devices for some time, including mechanical devices of varying kinds. It would provide a distinct advantage if a wireless remotely operable system could be used to operate single or bi-directional pneumatic actuating units to deploy and retract various devices selectively. This is particularly true with systems that employ multiple airbags to control a plurality of devices.

It is known to provide a system of monitoring CANbus information in an integrated wireless system. Such systems are shown in U.S. Pat. Nos. 8,751,098; 8,751,066; 8,625,295; and 8,565,758, for example. It would present a distinct advantage if such a type of system could be provided to control pneumatically operated devices in which single or dual-acting airbags were used to deploy and retract the devices.

SUMMARY OF THE INVENTION

By means of the present invention, there is provided a wireless airbag control system that can be used to control a single airbag or many associated airbags using a CAN network to communicate.

One embodiment includes a central master electronic control module which may be located in a vehicle or at a machine operator's station and which communicates wirelessly with a plurality of slave modules or nodes using an RF transceiver. Each slave node is associated with an airbag that is mounted to perform an operating function with respect to a mechanical implement or device and includes an RF transceiver, central processing unit, microprocessor, a host processor and CAN controller and, optionally, a terminating resistor.

Each node is able to send and receive messages and is connected to any desired sensors, actuators and control devices associated with the airbag. Control messages from the control module are selectively prioritized to provide coordinated control.

BRIEF DESCRIPTION OF THE DRAWINGS

The foregoing features and advantages of the invention will become apparent to those skilled in the art from the following detailed description of one or more preferred embodiments, especially when considered in conjunction with the accompanying drawings in which like numerals depict like parts:

FIG. 1 is a schematic representation of a control system for a multi-unit arrangement using a wireless airbag control system to selectively operate one or more devices in a plurality of devices that have airbag actuators;

FIG. 2 is a schematic representation of a wireless airbag control system in accordance with the invention showing single and dual-acting airbags;

FIG. 3 is a schematic representation that depicts a control system mounted on a uni-directional or single acting airbag unit having a single inflatable chamber;

FIG. 4 is a schematic drawing similar to FIG. 3 for a bi-directional dual-chamber airbag unit.

DETAILED DESCRIPTION

Figure 5:
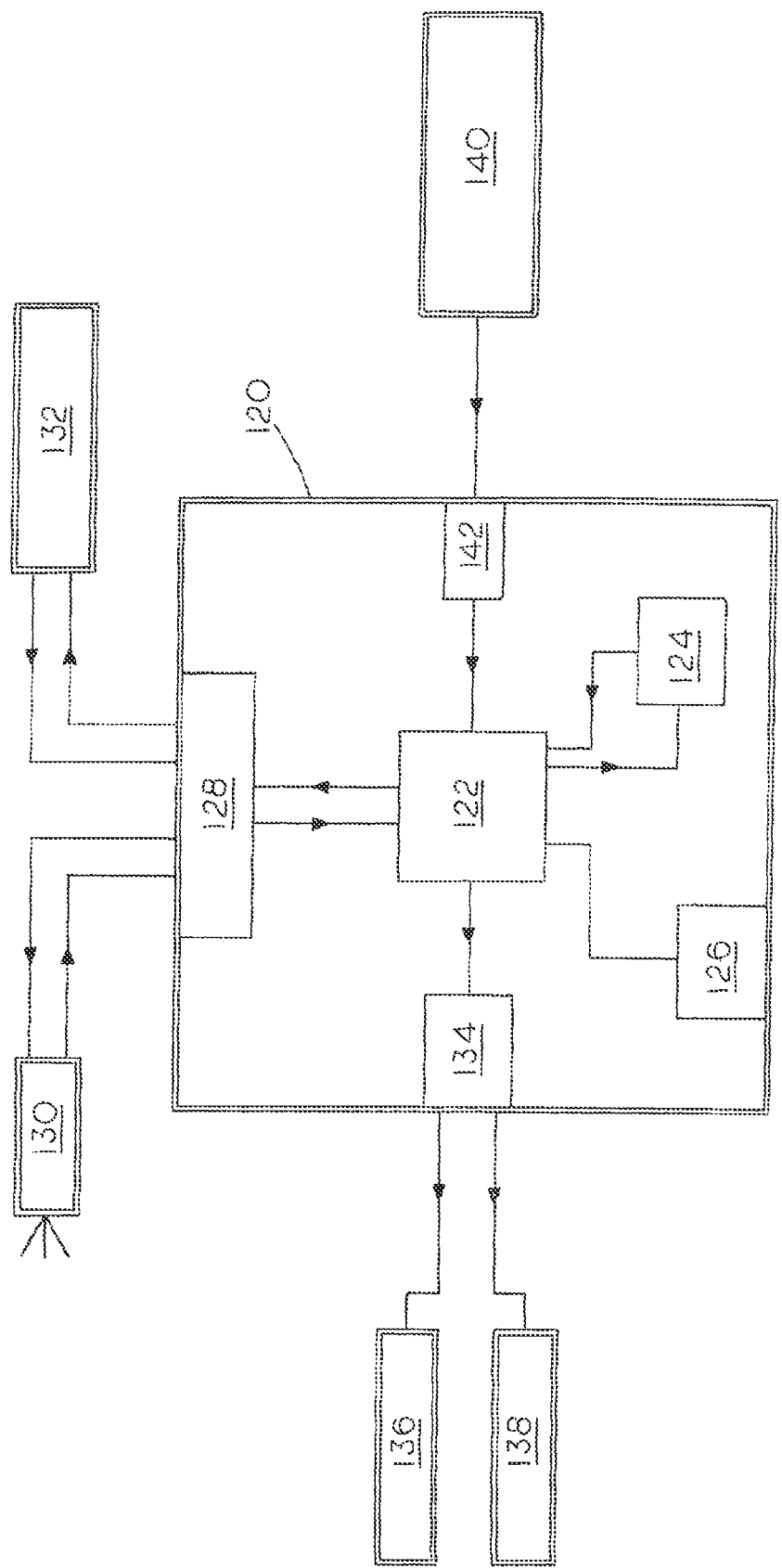
FIG. 5 is a schematic diagram of a control system associated with a processor housing for the airbag of FIG. 4.

The detailed description of the illustrative embodiments is intended to illustrate representative examples of the inventive concepts and is not intended to exhaust or limit the scope of those concepts. The examples are to be read in connection with the accompanying drawings, which are to be considered part of the entire written description of this invention. In the description, relative terms such as "lower", "upper", "horizontal", "vertical", "above", "below", "up", "down", "top" and "bottom", "left" and "right", as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

It should be noted that inflatable pneumatic operators in the form of conventional airbags have been found to be a preferred type of pneumatic operator, but other such devices could also be used.

The term "airbag", as used herein, is defined to mean any type of inflatable pneumatic operator, without limitation, including convoluted and non-convoluted devices with single and multiple air access ports, and ports at different locations. Single and double-acting units are also included.

The schematic representation of FIG. 1 depicts a multi-node wireless airbag control system generally at 10 having central master electronic control module 12 which may be located in a vehicle or at a machine operator's station and which communicates with a plurality of devices that use airbag actuators 10 using a wireless communication system that includes a plurality of slave modules or electronic control units (ECUs) also known as nodes 14, all of which are controlled by wireless transceivers 16 which communicate with a control module transceiver 18. A power supply for the master electronic control module is shown at 20. Each node further includes a power supply 22; at least one output to an airbag actuator as at 24 and receives input form each connected device as at 26. While FIG. 1 depicts 12 controlled nodes, such a setup can be used in a system that treats any number of devices that use airbag actuators.

It will be appreciated that the complexity of an Electronic Control Unit (ECU) or node can range from a simple I/O device up to an embedded computer with a CAN interface and sophisticated software. Each node requires a:

1) Central processing unit, microprocessor, or host processor

The host processor decides what the received messages mean and what messages it wants to transmit.

Sensors, actuators and control devices can be connected to the host processor.

2) CAN controller; often an integral part of the microcontroller

Receiving: the CAN controller stores the received serial bits from the bus until an entire message is available, which can then be fetched by the host processor (usually by the CAN controller triggering an interrupt).

Sending: the host processor sends the transmit message(s) to a CAN controller, which transmits the bits serially onto the bus when the bus is free.

3) Transceiver Defined by ISO 11898-2/3 Medium Access Unit [MAU] standards

Receiving: it converts the data stream from CANbus levels to levels that the CAN controller uses. It usually has protective circuitry to protect the CAN controller.

Transmitting: it converts the data stream from the CAN controller to CANbus levels.

Each node is able to send and receive messages, but not simultaneously. A message or Frame consists primarily of the ID (identifier), which represents the priority of the message, and up to eight data bytes. A CRC, acknowledge slot [ACK] and other overhead are also part of the message. The improved CAN FD extends the length of the data section to up to 64 bytes per frame. The message is transmitted serially onto the bus using a non-return-to-zero (NRZ) format and may be received by all nodes.

The devices that are connected by a CAN network are typically sensors, actuators, and other control devices. These devices are connected to the bus through a host processor, a CAN controller, and a CAN transceiver.

At the beginning of every message sent on a CANbus system the first few bits of information is a priority level. When a new message cycle begins every node sends out its priority and is also listening to every other nodes message priority. At the end of the message priority phase of the message only the node with the highest priority message continues to transmit and all of the other nodes receive the message. Every node hears every message, but only acts upon commands that are directed at it, completely ignoring the rest. In conventional wiring harnesses every node sends its information to nodes it needs to talk to using individual wires to each other node. On a system where there is a great plurality of nodes, a CANbus system eliminates an abundance of wires that can be the cause of a great number of problems.

The application of the present invention is designed to control airbag actuators with internal valves, preferably with some kind of sensor to determine how much load the airbag is creating. As indicated, in order to connect airbags to a CANbus system, each airbag becomes a node. Each airbag node requires a processor that can receive and send CANbus format messages. The processor must also be able to send and receive analog and or digital signals to the valves and sensors depending on the system requirements. Each airbag/node also requires a terminating resistor. The ones that are depicted in FIGS. 3 and 4 are external and can be removed to continue the chain to another node.

In some alternate applications, a sensor may not be required as, for example, on a retractable auxiliary axle associated with a heavy truck. The only thing that is required is an up or down command and opening the proper valve to inflate the proper airbag. In some cases, a sensor could be used to fine tune the amount of force being applied. Pressure sensors to determine the air pressure inside the airbags or strain gauges used to determine the amount of force being applied to an object can be used. Whatever the type of sensor or units of measure that are being used to quantify the load the airbag is creating, the processor needs to be able to correlate actual load against commanded load. The processor should also be able to open and close the appropriate valves on the airbag until the actual load is within a predetermined system tolerance of the commanded load.

As shown in the figures, the processor will be located in a housing attached to the airbag. Inside the processor housing the processor will have memory capacity to retain information that will be necessary for the processor to do its job. The processor will receive and send messages in CAN format, generate analog or digital signals from the CAN format messages it receives. The processor will send and receive a plurality of signals in analog and digital formats according to system requirements. The processor can be operatively connected to a single or a plurality of sensors to determine the actual load the airbag or airbags are creating. The processor will also be operatively connected to one or a plurality of control valves to change the position of the airbag or airbags. This will allow the processor to make commanded changes to the position of the airbag or the force the airbag is creating according to the information it is receiving from the sensors so that the commanded position or force matches what the sensor reads. The number of sensors and control valves will depend on the type of airbag used and its intended purpose.

The processor inside the processor housing will be operatively coupled to a wireless transceiver to send and receive CAN messages for mobile applications or applications that are not conducive to running a CANbus cable. The processor housing is provided with an external connection for a terminating resistor. Optionally, the terminating resistor can be mounted inside the processor housing for certain applications. External terminating resistors allow the airbag nodes to also be connected to a wired CANbus system.

The present invention uses wireless radio transceivers to send CANbus messages between the control interface and the individual airbags or sets of airbags. To do this, as indicated, every airbag becomes a CANbus node with a processor.

A schematic wireless airbag control system diagram is shown in FIG. 2. The system includes a virtual, terminal or control panel 30 that coordinates and controls operation of the system through wired CANbus system 32 and control transceiver 34 that communicates with wireless transceivers 36, 38, 40, and 42 which are connected to control processors in housings 44, 46, 48 and 50, respectively. Two types of dual-acting airbags are shown at 52 and 54 in which one or both sides can be inflated. Airbag 52 is non-convoluted and airbag 54 is convoluted. Likewise, single-acting airbags are shown at 56 and 58. A common electric power system used to operate valving associated with inflating and deflating the airbags is designated 60.

FIGS. 3 and 4 depict views of un-directional or single-acting and bi-directional or double-acting airbags, respectively, with attached wireless CANbus controls. This, in FIG. 3, there is shown a single-acting airbag unit 70 with an attached processor housing 72, associated radio transceiver 74 and external terminating resistor 76. A processor controller, not shown, is connected to an airbag valve solenoid system 78 by a signal wire 80 to inflate and exhaust the single expanding bag portion 82. A pressure sensor is shown at 84.

FIG. 4 is similar to FIG. 3 depicting a bi-directional or double-acting airbag 90 with inflatable chamber aspects 92 and 94. This unit includes processor housing 96 that houses a processor that controls an airbag solenoid system indicated by 98 with connection signal wire 100. Signal wires 102 and 104 connect upper and lower pressure sensors 106 and 108. A radio transceiver is shown at 110 and a terminal resistor at 112.

FIG. 5 is a schematic diagram of a control system associated with a processor housing shown at 120. It includes an internal processor or plurality of processors 122. The processor or processors connect to communicate with a memory 124 and an electric power input 126. Two-way communication is also shown with an input/output (I/O) module 128 which connects the processor(s) with an RF transceiver 130 and a terminal resistor 132. Connection is also made with airbag valve outputs at 134 with signals to upper and lower valves (FIG. 4) at 136 and 138. Information is received from one or more airbag sensors at 140 through inputs at 142.

In operation, the master electronic control module is operated to coordinate the operation of each associated airbag node and can selectively initiate inflation, deflation, adjust pressure, etc., of one or a plurality of airbags to coordinate operation of a plurality of airbag actuators on a mechanism(s) on any given mechanical system. Communication is by sending and receiving messages using RF transceivers and prioritized messages.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A wireless airbag control system comprising:
   a) a central master electronic control module having an RF transceiver and including a processor to selectively communicate prioritized messages to a plurality of slave nodes;
   b) a plurality of airbag devices capable of repeatable inflation and deflation, wherein each of said airbag devices is mounted to perform a controlled, repeatable operating function to deploy and retract an attached mechanical device;
   c) a plurality of slave nodes, each slave node being associated with one of said airbag devices, wherein each slave node further comprises an RF transceiver, a central processing unit, and a CAN controller; wherein each slave node further includes a terminating resistor; and wherein each slave node is connected to operate a plurality of associated airbag valve control devices to selectively allow air to enter and leave each airbag.

2. A wireless airbag control system as in claim 1 wherein each slave node is connected to a plurality of pressure sensors and wherein said control system controls air pressure in a plurality of associated airbags and adjusts the force exerted by each associated airbag to correlate actual load with a commanded load.

3. A wireless airbag control system as in claim 1 wherein each slave node is connected to one or more sensors for determining airbag position or force being applied.

4. A wireless airbag control system as in claim 3 wherein each said sensor for determining airbag force being applied is a strain gauge and wherein said control system controls air pressure in each associated airbag based on signals from each said sensor to correlate pressure with a commanded set point.

5. A wireless airbag control system as in claim 1 wherein each slave node is connected to one or more pressure sensors and wherein said control system controls air pressure in each said associated airbag to adjust the force exerted to correlate actual load with a commanded load.

* * * * *